Jan. 4, 1966 R. A. JOHNSON 3,227,961

AUTOMATIC SELECTIVITY CONTROL CIRCUIT

Filed Feb. 27, 1962

INVENTOR.
RODERICK A. JOHNSON
BY Weingarten, Orenbuch, & Pandiscio
ATTORNEYS 3,227,961
AUTOMATIC SELECTIVITY CONTROL CIRCUIT
Roderick A. Johnson, Boston, Mass.
(7 Coleus Park, Dorchester, Mass.)
Filed Feb. 27, 1962, Ser. No. 176,062
1 Claim. (Cl. 330—59)

This invention relates in general to electronic apparatus having a variable band width and more particularly pertains to an arrangement for causing the band width of a tuned circuit in a radio frequency (RF) or audio frequency (AF) amplifier to vary automatically in dependence upon the strength of the input signal.

The selectivity of a radio receiver is that characteristic which determines the extent to which the receiver is capable of distinguishing between the desired signal and disturbances of other frequencies. Unless the selectivity can be increased when weak signals are received, high-frequency noise and cross-talk are obtained. The high-frequency noise can be minimized by restricting the frequency response range of the audio-frequency portion of the receiver. This expedient, however, does not reduce the cross-talk which may result from the relatively wide band of frequencies which is permitted to reach the detector. Both high-frequency noise and cross-talk can be minimized by increasing the receiver selectivity. It is, therefore, desirable that a receiver be equipped with a means whereby the selectivity is increased as the receiver's sensitivity is increased if the maximum fidelity consistent with reasonable freedom from cross-talk and high-frequency noise is to be obtained.

Conventional selectivity controls may be either tuned manually by an operator or automatically by an automatic selectivity control. The automatic selectivity control has two distinct advantages over the manual arrangement for varying selectivity. The first advantage is that a receiver equipped with an automatic selectivity control eliminates excessive noise in the receiver when receiving weak signals. The second advantage is that where a receiver having an automatic selectivity control is used to receive signals subject to periods of fading, a considerably better signal-to-noise ratio is maintained in receivers equipped only with automatic volume control. Of the prior arrangements for obtaining automatic selectivity, most are not used because they require such complex circuitry or numbers of components whose sole function is to provide variable bandwidth that those arrangements increase the cost of radio receivers inordinately.

The primary object of the present invention is to provide an automatic selectivity control permitting the bandwidth of a tuned circuit in an RF, I.F., or AF amplifier to be automatically varied with signal strength, the bandwidth varying between a maximum for signals above an arbitrary level and a minimum for the weakest signal. An advantage of the invention is that only a small number of electrical components are required to vary the bandwidth. The control system causes the bandwidth of the amplifier to be proportional to the strength of the input signal where the signal is below a preset level. The invention can be used in conjunction with an I.F. stage of a radio receiver and preferably is installed in the I.F. stage closest to the front end of the receiver.

The invention utilizes a "Q multiplier" having a tuned circuit which is made regenerative to increase the sharpness of resonance, i.e., to increase the "Q" of the tuned circuit many times beyond its normal value. The Q multiplier is employed to enhance the selectivity of another tuned circuit so that the tuned circuit responds to a narrower band of frequencies.

In the preferred embodiment, the Q multiplier is coupled to the I.F. stage of a radio receiver, and the selectivity of the receiver is varied by varying the amount of coupling with the Q multiplier. Thus, when the receiver receives a strong signal and a broad bandwidth is desired, little or no energy is coupled into the Q multiplier. However, when a weak signal is received, it is desired to obtain a narrow bandwidth of the signal so that excessive high-frequency noise and cross-talk will be eliminated and, therefore, most of the received energy is coupled into the Q multiplier. The amount of energy coupled into the Q multiplier is varied by employing a photocell to act as a variable resistor in a coupling network between the signal from the receiver obtained from a terminal in the I.F. stage and the Q multiplier. Means are provided for varying the resistance of the photocell in accordance with the strength of the signal at the I.F. terminal of the receiver. The Q multiplier is, in effect, a regenerative circuit which narrows the bandwith of the received signal and feeds it back to the receiver's I.F. stage at a higher level and in proper phase to add to the original signal.

The invention, both as to its construction and mode of operation, can be better understood from a perusal of the following exposition when considered together with the accompanying drawings in which.

Figure 1:
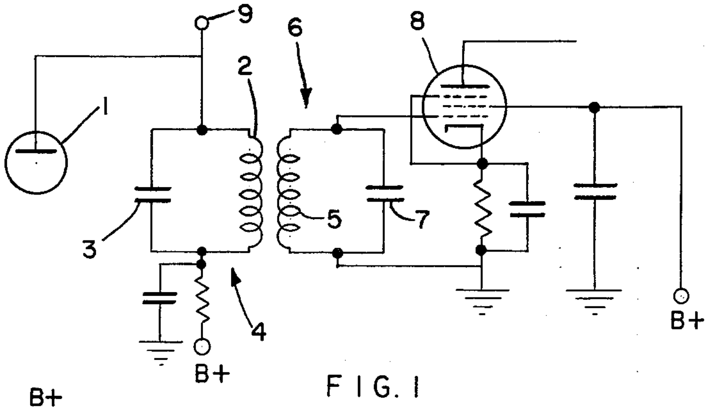
FIG. 1 depicts the first I.F. stage of a conventional heterodyne radio receiver.

A familiarity with the intermediate frequency (I.F.) portion of a radio receiver is helpful to an understanding of the invention. FIG. 1 depicts the I.F. stage of a conventional heterodyne receiver and particularly the first I.F. stage of a receiver which is coupled by a transformer to the converter. As is well known, the radio frequency signals received at the antenna of the radio receiver are converted to a lower frequency range termed the intermediate frequencies. The conversion is made because the apparatus for amplifying electrical signals is better able to amplify signals at the lower frequency. The conversion is accomplished in the conventional heterodyne receiver by a converter tube 1 whose output is applied to the primary winding 2 of a transformer known as the I.F. transformer. The primary winding 2 and capacitor 3 forms a parallel resonant circuit 4 which is inductively coupled through the secondary winding 5 to the parallel resonant circuit 6 formed by that secondary winding and capacitor 7. The amplifier tube 8 of the first I.F. stage derives its input signal from across the secondary tuned circuit 6.

I.F. transformers in super-heterodyne receivers are usually of the type depicted in FIG. 1, that is, are usually of the type having tuned primary and tuned secondary windings. I.F. transformers are designed to pass a selected band of frequencies, viz., the intermediate frequencies. The selectivity of the I.F. transformer is determined by the Q of the tuned circuits, and since, conventionally, the Q of those circuits is fixed, the selectivity of the I.F. transformer is fixed.

Figures 2, 3:
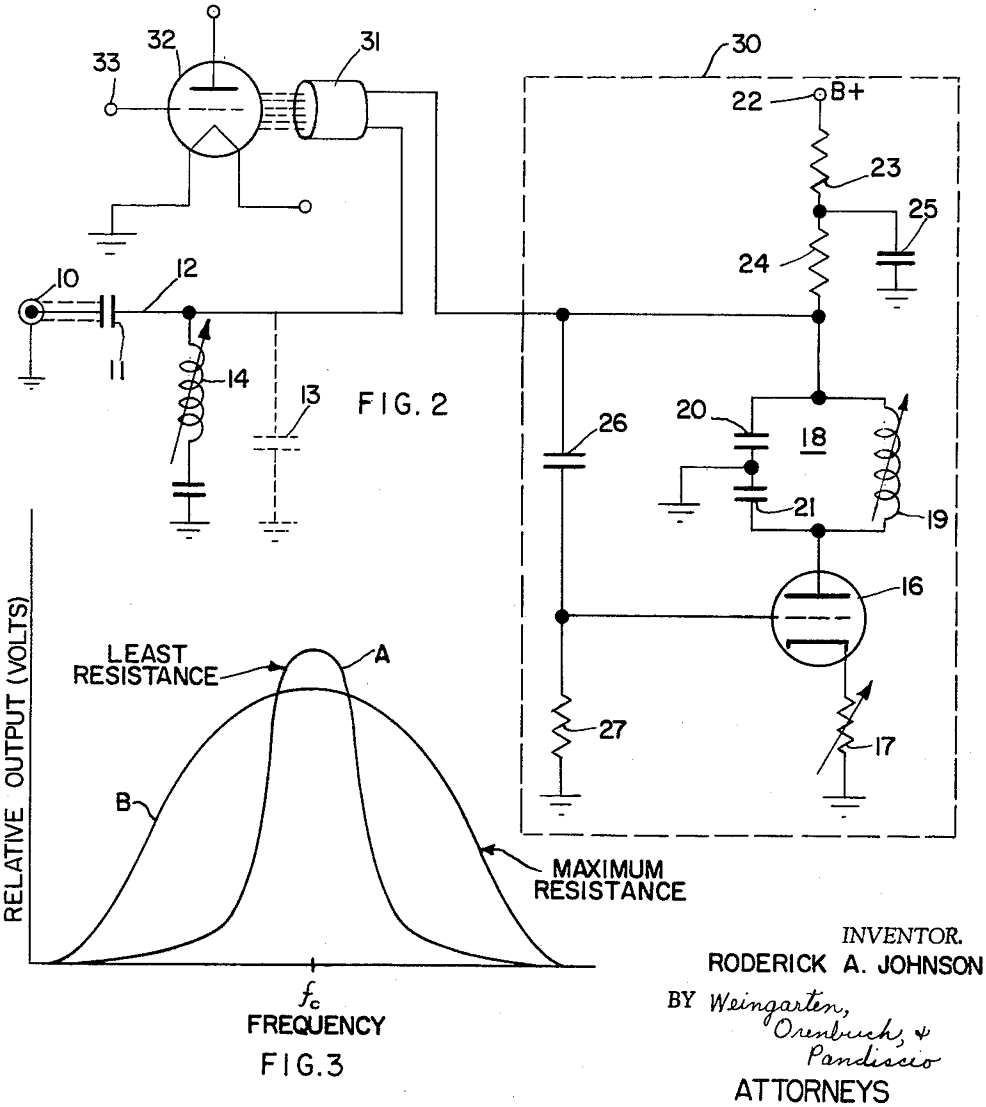
FIG. 2 illustrates the scheme of the preferred embodiment of the invention.
FIG. 3 are curves showing the effect on selectivity caused by the operation of the invention.

Referring now to FIG. 2, there is depicted a preferred embodiment of the invention having a signal input terminal 10 which is intended for connection to a tuned stage of a conventional heterodyne or super-heterodyne radio receiver. For example, the terminal 10 may be connected to terminal 9 in the conventional receiver of FIG. 1 so that the input signals are derived across tuned primary 2. To prevent the B+ voltage on the plate of converter tube 1 from passing, a blocking capacitor 11 is placed in transmission line 12. Preferably, the transmission line is a shielded cable. The signal on the transmission line is prevented from being shunted to ground through the distributed capacity of that line (the distributed capacity of the line is indicated by phantom capacitor 13) by employing an inductor 14 and capacitor 15 between ground and the transmission line to form a parallel resonant circuit with the distributed capacity 13. That parallel resonant circuit is tuned so that it presents its highest impedance to I.F. signals on the transmission line.

Indicated within block 30 is a Q multiplier having an amplifying tube 16 whose cathode is connected to ground through a resistor 17. The anode of tube 16 is coupled to a tuned circuit 18 having an inductor 19 in connection with capacitors 20 and 21. A source of direct voltage (B+) is applied at terminal 22, through resistors 23, 24 and tuned circuit 18, to the tube's anode. A by-pass capacitor 25 is provided to prevent RF from entering the power source. A regenerative feedback path is provided from the tuned circuit 18 to the grid of tube 16 by capacitor 26, the grid being coupled through resistor 27 to ground.

In discussing the operation of the Q multiplier, it is assumed that a signal having a number of frequencies in it is applied to the grid of tube 16 and that all such frequencies are amplified by the tube. Circuit 18 presents its maximum impedance to signals at the resonant frequency to which that circuit is tuned so that large currents at the resonant freqency and frequencies close to it build up in the circuit. Signals on either side of the resonant frequency are presented with a relatively low impedance and pass through the tuned circuit to resistor 24 and by-pass capacitor 25.

Interposed in transmission line 12 between terminal 10 and the Q multiplier 30 is a photosensitive cell 31 whose resistivity varies in accordance with the amount of light received by it. The cell 31 is of the type whose resistance varies inversely with the intensity of light and, preferably, is a cadmium selenide cell. Such cells have a resistance of about 150 ohms when fully illuminated and have a resistance in the order of 10 megohms in the absence of illumination. A tube 32 is provided of the type which emits light in proportion to the strength of the signal applied to its grid. Tube 32 can be a tube of the type designated DM70 manufactured by the Telefunken Company of Germany. Photosensitive cell 31 is positioned to detect the intensity of light emitted by tube 32, and for this purpose both of those units may be enclosed in a box to exclude other sources of light. A voltage inversely proportional to the strength of the incoming signal arriving at the receiver is applied at terminal 33 to the grid of tube 32. In conventional receivers, the signal variously known as the automatic gain control (A.G.C.) signal or the automatic volume control (A.V.C.) signal is preferably used as the signal which is applied to the grid of tube 32. However, it should be understood that any rectified signal which is inversely proportional to the incoming signal strength is useful for controlling the light output of tube 32.

Where a strong signal is applied to the grid of tube 32, the tube emits a high intensity beam of light which is incident on photocell 31, causing the resistance of the photocell to be low. Conversely, where a weak signal is applied to the grid of tube 32, the tube emits a low intensity beam of light which causes the resistance of the photocell to be relatively high.

In the operation of the apparatus of FIG. 2, it is assumed that the A.G.C. signals of the receiver are applied at terminal 33 to the grid of tube 32 and that simultaneously signals from the tuned primary of the first stage I.F. transformer of the receiver are applied to terminal 10. The resistance of photocell 31, accordingly, is governed by the A.G.C. signal, the resistance of the photocell being least when the weakest incoming signals are received and being greatest when the incoming signals exceed a predetermined strength. Where a strong signal arrives at the receiver's antenna, the A.G.C. bias of the receiver is such that the light output of tube 32 is minimum. Input signals appearing at this time at terminal 10 are largely decoupled from the Q multiplier by the resistive impedance of the photocell. The band pass of the I.F. transformer (FIG. 1) is then determined almost entirely by its own Q and its frequency response is indicated by curve B (maximum resistance of photocell) in FIG. 3. Where the strong signal starts to fade, however, and becomes progressively weaker, after the signal strength passes beyond a preset point, the A.G.C. bias causes tube 32 to increase its light intensity, whereupon the resistance of photocell 31 decreases. The decrease in resistance of the photocell results in greater coupling between the Q multiplier and the signals impressed at terminal 10. The increased coupling, in effect, causes the sharpness of resonance of the tuned primary of the I.F. transformer to be improved. With the weakest incoming signals at the receiver's antenna, the coupling between terminal 10 and the Q multiplier is maximum and the Q of the tuned primary of the I.F. transformer is improved to an extent such that the band pass of the transformer is represented by curve A (least resistance of photocell) in FIG. 3.

It is readily apparent that for received signals having intermediate strength, the bandpass of the I.F. transformer is intermediate the broadness of curve B and the sharpness of curve A.

When operating a radio receiver or amplifier having an automatic selectivity control circuit constructed in accordance with the invention, it may become necessary to vary certain elements of the circuit to give the device adaptability to different situations. Such elements are shown in the drawings as having arrows therethrough, in accordance with conventional meaning. However, it is obvious that other elements of the circuit may be varied, or that if the device is used with a specific amplifier or receiver, all the components shown as variable could have fixed values. In view of the obvious modifications which may be made, it is intended that the invention not be limited by the precise structure which is illustrated, but rather that the scope of the invention be construed in accordance with the appended claim.

What is claimed is:

An automatic selectivity control circuit for governing the selectivity of an amplifier of the type having a tuned circuit by controlling the Q of the tuned circuit, the automatic selectivity control circuit comprising:

a Q multiplier device;

means for emitting light of an intensity varying in dependence upon the strength of the amplfier's input signal;

and apparatus coupling the Q multiplier device to the amplifier's input circuit, the coupling apparatus including photosensitive means disposed to have the generated light incident upon it, and the photosensitive means controlling the impedance of the coupling apparatus in response to the intensity of the incident light.

References Cited by the Examiner

UNITED STATES PATENTS

| | | | |
|---|---|---|---|
| 2,169,830 | 8/1939 | Case | 325—427 |
| 2,774,043 | 12/1956 | Villard | 333—80 |
| 3,087,120 | 4/1963 | Schoellhorn et al. | 330—59 |

ROY LAKE, *Primary Examiner.*

NATHAN KAUFMAN, *Examiner.*